June 17, 1924.

H. J. GAGE

MIRRORSCOPE

Filed Aug. 13, 1919

INVENTOR
Harold J. Gage

BY Strong & Townsend
ATTORNEYS

June 17, 1924.
H. J. GAGE
MIRRORSCOPE
Filed Aug. 13, 1919
1,498,524
3 Sheets-Sheet 2
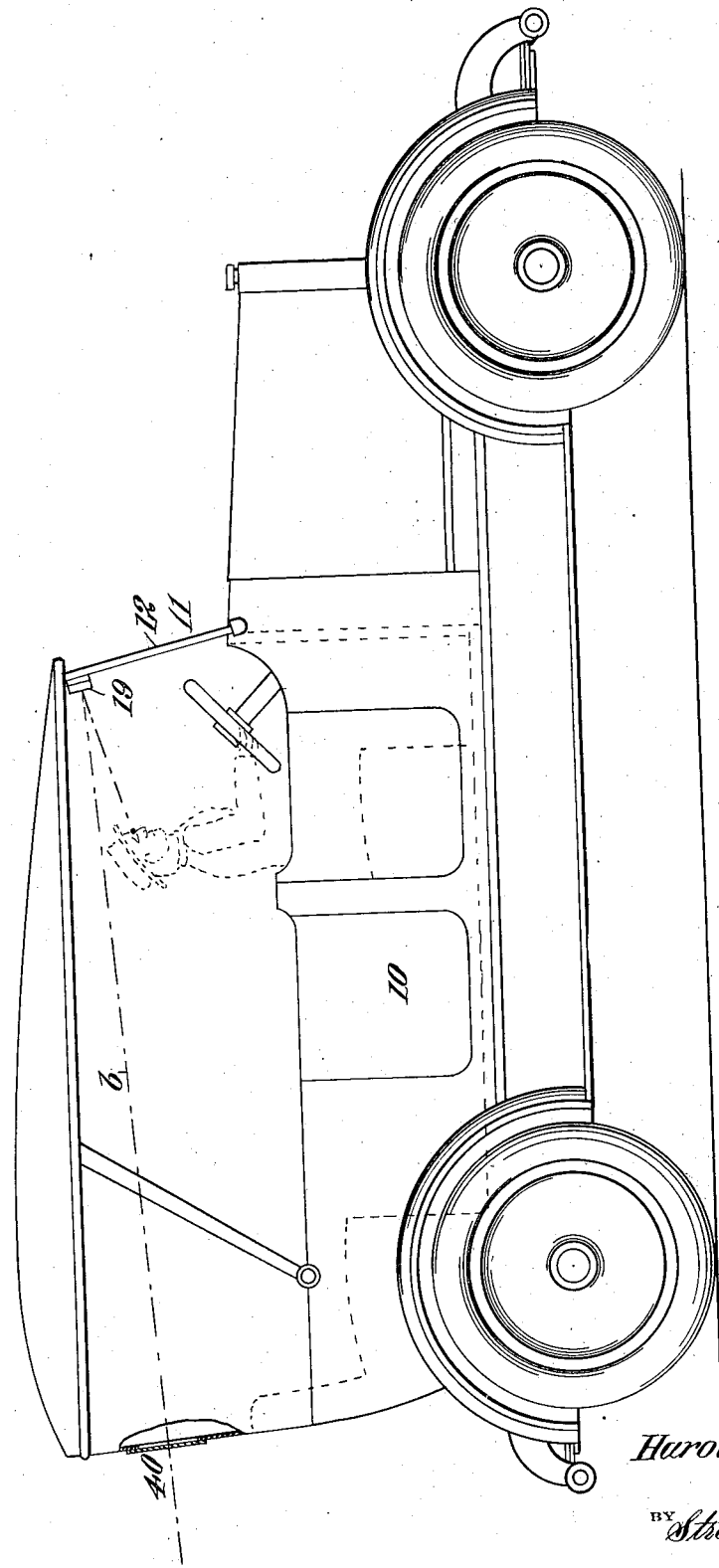

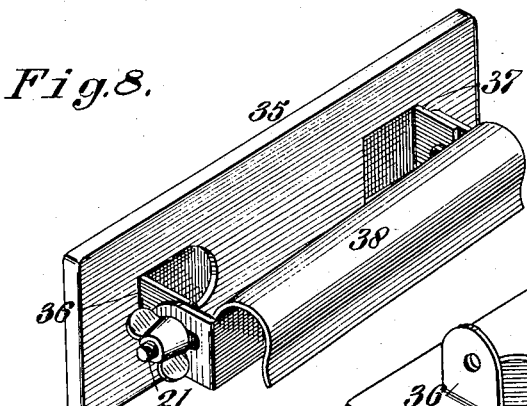
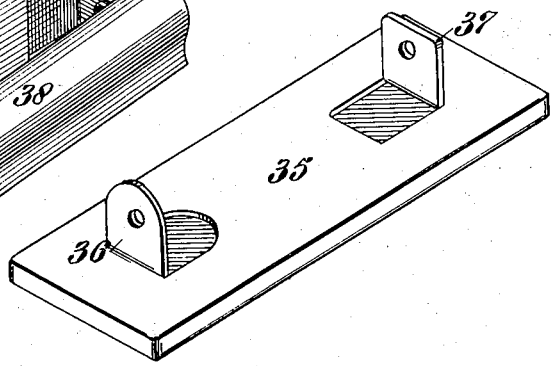
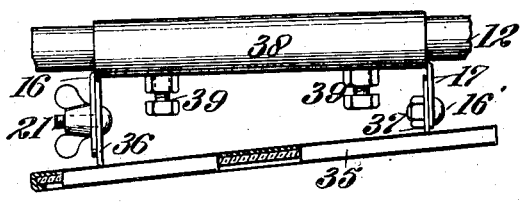
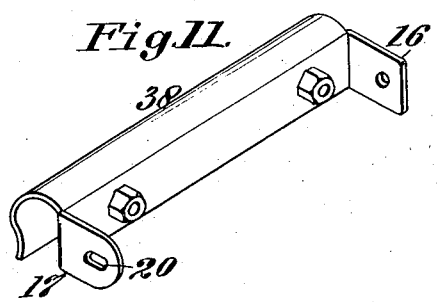
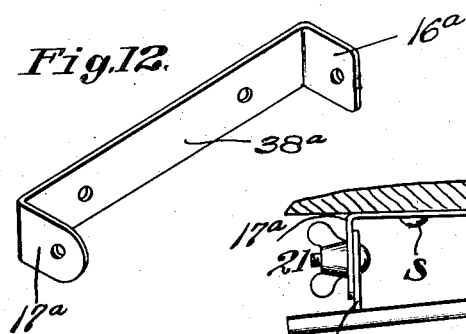
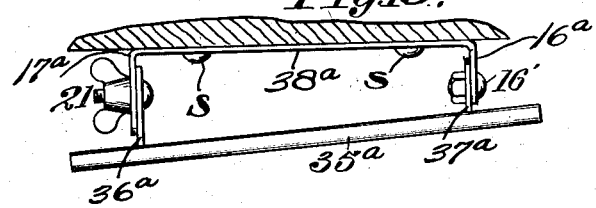

Patented June 17, 1924.

1,498,524

UNITED STATES PATENT OFFICE.

HAROLD J. GAGE, OF STOCKTON, CALIFORNIA, ASSIGNOR TO JOHN R. OISHEI, OF BUFFALO, NEW YORK.

MIRRORSCOPE.

Application filed August 13, 1919. Serial No. 317,184.

*To all whom it may concern:*

Be it known that I, HAROLD J. GAGE, a citizen of the United States, residing at Stockton, in the county of San Joaquin and State of California, have invented new and useful Improvements in Mirrorscopes, of which the following is a specification.

This invention relates to a mirrorscope for use on vehicles.

It is the principal object of the present invention to provide a reflector adapted to be easily mounted upon the wind shield of an automobile and to be readily adjusted so that the driver of the vehicle may conveniently observe the roadway in the rear of a machine without moving from a driving position.

The present invention contemplates the use of a bracket adapted to be detachably mounted upon one of the frame members of a wind shield and to adjustably support a reflecting mirror, the adjustable supports permitting the mirror to be disposed at any angle in relation to the horizontal and the vertical, thus making it possible to set the mirror so that a line of vision may be obtained, preferably through the center of the car and the window at the rear thereof, and then diverted directly into the line of vision of the driver.

The invention is illustrated in the accompanying drawing, by way of example, in which—

Fig. 7 is an enlarged view in side elevation, illustrating the line of sight obtained by the use of the reflector, as applied to an automobile.

Fig. 8 is a view in perspective, illustrating another form of the invention embodying certain changes in details of construction.

Fig. 9 is a view in perspective, more clearly showing the construction of the reflector frame as used in the device shown in Fig. 8.

Fig. 10 is a view in plan, showing the modified form of the invention as applied to a wind shield frame.

Fig. 11 is a view in perspective, illustrating the clamping bracket.

Fig. 12 is a view in perspective, illustrating a slightly modified form of the hinged frame or bracket.

Fig. 13 is a sectional plan view of the modified form shown in Fig. 12 attached to the vehicle.

Referring more particularly to the drawings, 10 indicates an automobile, here shown as fitted with a wind shield 11. This wind shield is formed with a rigid frame 12, adapted to embrace a pane of glass 13.

Figure 3:
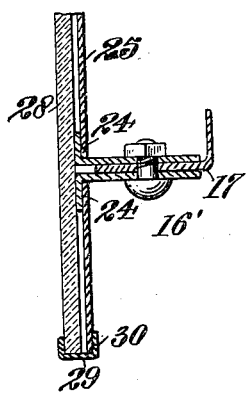
Fig. 3 is a view in horizontal, central section through one of the connections between the bracket and the reflector frame, particularly disclosing the details of construction.
Figure 4:
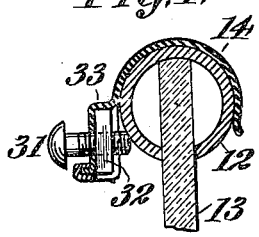
Fig. 4 is a view in transverse section, as seen on the line 4—4 of Fig. 2, showing the manner in which the wind shield frame is gripped.
Figure 5:
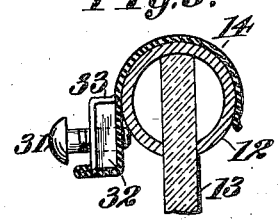
Fig. 5 is a view in transverse section on line 5—5 of Fig. 2, further illustrating the action of the clamping bracket.

Referring more particularly to Figs. 1 to 5 inclusive, it will be seen that a clamping bracket 14 is provided to pass around the upper horizontal frame member of the wind shield and to grip the same, as clearly shown in Fig. 4. The clamping bracket is formed of a piece of spring steel bent to assume a U-shaped cross section and to conform to the physical contour of the frame. The opposite ends of this bracket are formed with tangs 16 and 17, of unequal lengths. The tang 17 is perforated to receive a hinge bolt 16' which passes through a hinge bracket 18 projecting from the back of a reflector frame 19. The tang 16 is formed with a slotted opening 20, through which a hinge bolt 21 extends. This bolt also passes through a hinge bracket 18, identical with the one previously mentioned, and secured to the other end of the mirror frame.

Figure 6:
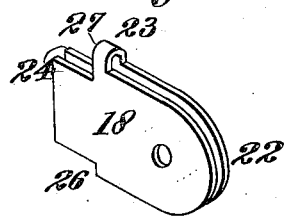
Fig. 6 is a view in perspective, illustrating the tangs mounted upon the back of the reflector frame and adapted to pivotally engage the clamping bracket.

The hinge brackets, as shown in Fig. 6, are formed of a single piece of metal stamped to provide two ears 22. These ears are connected by a narrow metal strip 23 which permits them to be readily bent to assume positions parallel to each other and slightly spaced from each other. This space is provided to accommodate the tangs 16 and 17 of the bracket 14. Formed as continuations of the ears 22 are fastening extensions 24. These members are adapted to pass through slotted openings in the back plate 25 of the reflector frame 19 and are there turned outwardly and forced flat against the reflector frame, as shown in Fig. 3. These out-turned portions act in conjunction with shoulders 26 and 27 to hold the hinge brackets in rigid relation to the frame and to cause them to assume parallel positions in relation to each other and to be disposed at right angles to the back of the plate 25.

The reflector frame 19 may be of any design to accommodate a mirror 28 of a shape meeting the fancy and convenience of the car owner.

Figure 1:
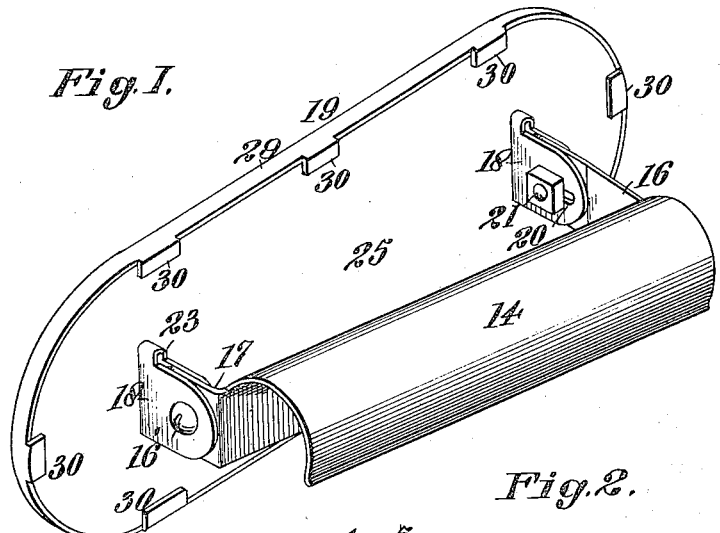
Fig. 1 is an enlarged perspective view, illustrating the preferred form of the invention, and particularly disclosing the wind shield fastening element.
Figure 2:
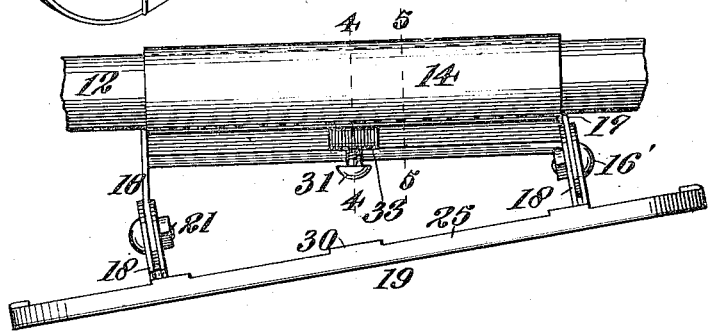
Fig. 2 is a view in plan, illustrating the preferred form of the invention as in position upon one of the frame members of a wind shield.

In Fig. 1 the mirror is shown as to be ovoidal and is bounded by a clamping frame 29 having an inturned front flange for retaining the mirror in position against the back plate 25. A plurality of tangs 30 are formed upon the frame 28 and are adapted to be turned over the back plate 25 to hold the back plate, the mirror and the frame member in fixed assembled relation to each other.

In order that the clamping bracket may be securely held upon the frame member 12, a lock-bolt 31 is provided. This bolt is fitted with a nut 32 adapted to be seated within a squared protrusion 33 of the bracket member 14. As shown in Fig. 4, the end of the bolt 31 is adapted to be forced inwardly to engage the surface of the frame member 12 at a point below the transverse center thereof, thus acting in combination with the U-shaped bracket to hold the structure rigidly upon the frame member and without possibility of accidental displacement, due to the vibration of the vehicle.

Referring more particularly to Figs. 8 to 11 inclusive, it will be seen that another form of construction is embodied in producing a reflector of the same type previously described. In this construction, a one-piece mirror frame 35 is made. This frame is stamped to form a back plate and marginal flanges for holding a mirror.

Struck out from the back plate are two tangs 36 and 37, perforated to receive hinge bolts 16' and 21 respectively. These bolts also pass through tangs 16 of a clamping bracket 38, which members are formed identical with those used in the other form of the invention. The bracket 38 is intended to spring over the frame member 12 and to be held in this position by a pair of clamping bolts 39, which act in a manner similar to the bolt 31 to hold the structure rigidly upon its intended mounting.

Figs. 12 and 13 show a slightly modified form of bracket adapted to be connected to the windshield frame or a part of the vehicle by bolts, screws, or the like. In this form, 38ᵃ designates the attaching means which has angular spaced arms or ears 16ᵃ and 17ᵃ preferably integral and substantially rigid therewith. The attaching means may be readily attached to the windshield frame or to a part of the vehicle by screws or bolts S. The mirror holding portion is preferably similar to such portions shown in Figs. 8 to 11, having a pair of spaced ears 36ᵃ and 37ᵃ preferably integral with and struck out from the body 35ᵃ of the mirror holding portion and preferably rigid therewith. As in the hereinbefore described forms, the arms and ears are apertured and slotted, so as to have a pivotal connection at one side of the bracket and a pivotal and sliding connection at the other side of the bracket, as in Fig. 1, where one of the ears of the mirror holding plate is slotted, bolts 16' and 21 serving to hold the parts together and in adjusted positions.

An examination of the two forms of reflector shown in the drawings will disclose the fact that it is possible to position the reflector at any desired angle to the vertical and also to move the reflector through a horizontal plane to accommodate the requirements of the driver and to properly focus the mirror for his convenience. This action is, of course, permitted by the hinge bolt 16' and the slot 20 in the long tang 16 of the clamping bracket Fig. 1. It is therefore possible to incline the mirror so that a line of vision may be obtained, as indicated by a—b in Fig. 7, where it will be seen that the driver will have a direct line of vision to the reflector without inconvenience and that the roadway may be observed through the window curtain 40 along the line b.

It will thus be seen that the device here disclosed possesses numerous advantages when its cheapness of construction and simplicity of design is considered and at the same time provides an adjustable view reflector adapted to be readily mounted at a convenient point upon a vehicle and to furnish the driver with a satisfactory view of the roadway directly in the rear of the vehicle.

While I have shown the preferred form of my invention as now known to me, it will be understood that various changes in the combination, construction and arrangement of parts may be made by those skilled in the art, without departing from the spirit of my invention as claimed.

Having thus described my invention, what I claim and desire to secure by Letters Patent is—

1. An adjustable view reflector, comprising an oblong mirror, a continuous relatively long bracket for detachably securing the mirror to a vehicle, said bracket extending horizontally across the back of the mirror to the end portions thereof, spaced means located at the end portions of the mirror for pivoting said end portions to the ends of the bracket to permit the mirror to swing vertically, and means embodied in the said means at one end of the bracket for permitting the pivotal axis of the mirror to be moved horizontally for adjusting the mirror angularly with relation to the bracket.

2. An adjustable view reflector, comprising a mirror, a mirror frame therefor, end hinge brackets of equal length extending from the back of the mirror frame at the end portions thereof, clamping means for securing the mirror frame to a vehicle, and spaced bracket members carried by the clamping means and pivotally connected to the end hinge brackets of the mirror frame to permit the same to swing vertically, one of the brackets being longer than the other and having an elongated opening, whereby the pivotal axis at that end of the mirror frame may be adjusted horizontally.

3. In an adjustable view reflector, a continuous bracket adapted to engage a frame member of a vehicle, tangs of unequal length formed integral with the opposite ends of the bracket, an oblong mirror frame, end hinge brackets on said mirror frame pivotally connected by horizontal bolts to said tangs, whereby the mirror may be swung vertically, the shorter of said tangs being formed with a circular perforation and the longer of said tangs having a slotted perforation through which said bolts pass to permit the mirror frame to be adjusted angularly with relation to the clamping bracket.

4. A device of the character described, comprising a continuous clamping bracket formed of a plate of resilient metal and approximately U-shaped in cross section to frictionally engage a frame of a vehicle, tangs of unequal length formed integral with the opposite ends of said clamping member, an oblong mirror frame, spaced end hinge brackets carried by the said frame at the end portions thereof and conforming to the opposite sides of said tangs, the shorter of said tangs being formed with a circular perforation and the longer of said tangs having a slotted perforation, hinge bolts passing through the said brackets and the perforations in the tangs to permit the mirror frame to swing vertically and to have angular horizontal adjustment with relation to the clamping bracket, and means for positively fastening the clamping bracket on the frame.

5. A device of the character described, comprising a relatively long continuous clamp adapted to be secured on a windshield frame, a pair of tangs extending one from each end of said clamp, an oblong mirror frame having a pair of end hinge brackets located at the end portions of the mirror frame and pivotally connected to said tangs by horizontal bolts to permit the mirror frame to be turned vertically, and means embodied in the pivotal connection of one of the brackets to permit horizontal angular adjustment of the mirror frame with relation to the clamp.

6. In a rear view mirror for vehicles, holding means adapted to be secured to a mirror plate, and adjustable supporting means therefor, including a pair of spaced members rigid with said holding means and extending therefrom, attaching means adapted to be secured to a support on the vehicle, a pair of spaced arms rigid with said attaching means, a pivotal connection between said members and arms to permit the mirror to swing vertically, and means embodied in the supporting means at one end thereof for permitting the pivotal axis of the mirror to be moved horizontally for adjusting the mirror angularly with relation to the attaching means.

7. An adjustable rear view reflector, comprising a mirror plate, a holding member therefor, attaching means for securing the reflector to a vehicle, pairs of spaced brackets carried by the mirror plate and attaching means, pivotal connections between the brackets of the mirror plate and of the attaching means to permit the mirror plate to swing vertically, one of the brackets being longer than the other and having an elongated slot therein whereby the pivotal axis at that end of the mirror plate may be adjusted horizontally.

8. An adjustable rear view reflector, comprising a mirror plate, a holding member therefor, attaching means for securing the reflector to a vehicle, pairs of spaced brackets carried by the mirror plate and attaching means, pivotal connections between the brackets of the mirror plate and of the attaching means to permit the mirror plate to swing vertically, one of the brackets being longer than the other and having an elongated slot therein whereby the pivotal axis at that end of the mirror plate may be adjusted horizontally, and means for releasably securing said mirror plate and said attaching means in adjusted positions against relative movements one to the other.

9. An adjustable supporting device for rear view mirrors for vehicles, comprising a one-piece holder plate of sheet metal having a pair of rearwardly extending integral ears formed of an integral portion of the metal of said plate bent outwardly from intermediate the ends thereof, an attaching device adapted to be secured to a support on the vehicle and having parts pivotally connected to said holder plate ears for permitting the mirror to swing vertically and means embodied in the connection between one of said holder plate ears and its cooperating attaching device part and comprising an elongated slot whereby said mirror may be adjustably move simultaneously in horizontal and vertical directions, and means for releasably securing said holder plate and said attaching device against relative movement one to the other.

In testimony whereof I have hereunto set my hand in the presence of two subscribing witnesses.

HAROLD J. GAGE.

Witnesses:
C. F. CHRISMAN,
WM. V. HOEHNER.